US012684042B2

(12) United States Patent
Hede et al.

(10) Patent No.: US 12,684,042 B2
(45) Date of Patent: Jul. 14, 2026

(54) FRAMEWORK TO RESOLVE PROTOCOL ENDPOINTS IN INTEGRATION PLATFORM

(71) Applicant: SAP SE, Walldorf (DE)

(72) Inventors: Bhagyesh Hede, Bangalore (IN);
Shankara Prasad K, Puttur (IN);
Subhankar Chattopadhyay, Bangalore
(IN); Ghanshyam Prasad Arvind,
Bangalore (IN)

(73) Assignee: SAP SE, Walldorf (DE)

( * ) Notice: Subject to any disclaimer, the term of this
patent is extended or adjusted under 35
U.S.C. 154(b) by 316 days.

(21) Appl. No.: 18/466,990

(22) Filed: Sep. 14, 2023

(65) Prior Publication Data

US 2025/0097305 A1 Mar. 20, 2025

(51) Int. Cl.
*H04L 67/147* (2022.01)
*H04L 47/20* (2022.01)
(Continued)

(52) U.S. Cl.
CPC ............ *H04L 67/147* (2013.01); *H04L 47/20*
(2013.01); *H04L 67/02* (2013.01); *H04L*
*67/146* (2013.01); *H04L 69/22* (2013.01)

(58) Field of Classification Search
CPC ....... H04L 47/20; H04L 67/02; H04L 67/146;
H04L 67/147; H04L 69/22
See application file for complete search history.

(56) References Cited

U.S. PATENT DOCUMENTS 8,793,359 B1 * 7/2014 Fiebig ................. G06F 11/3003
719/313
11,792,291 B1 * 10/2023 Mungel ................... H04L 67/02
709/203
(Continued)

FOREIGN PATENT DOCUMENTS

WO WO-2015065398 A1 * 5/2015 ............. G06F 16/35
WO WO-2022263869 A1 * 12/2022 ............. H04L 67/60

OTHER PUBLICATIONS

C. Brooks, M. S. Mazer, S. Meeks, and J. Miller. Application-
specific proxy servers as HTTP stream transducers. In Proceedings
of the Fourth International World Wide Web Conference, Boston,
Massachusetts, Dec. 1995, pp. 539-548 (Year: 1995).*
(Continued)

*Primary Examiner* — David R Lazaro
*Assistant Examiner* — Robert A Shaw
(74) *Attorney, Agent, or Firm* — Buckley, Maschoff &
Talwalkar LLC

(57) ABSTRACT

An ingress component may receive, from a client, an HTTP
URL and HTTP header information for an incoming proto-
col message (e.g., an AS2 message). An endpoint selector
may determine the HTTP header information along with an
endpoint address associated with the incoming protocol
message. Based on the incoming HTTP header information
and the endpoint address of the incoming protocol message,
the endpoint selector may dynamically resolve an appropri-
ate deployed endpoint and output an indication of the
dynamically resolved appropriate deployed endpoint. A run-
time component of an integration platform can then execute
the incoming protocol message and interface with the appro-
priate deployed endpoint.

12 Claims, 8 Drawing Sheets

(51) Int. Cl.
    *H04L 67/02*          (2022.01)
    *H04L 67/146*        (2022.01)
    *H04L 69/22*          (2022.01)

(56)                References Cited

U.S. PATENT DOCUMENTS

| | | | | |
|---|---|---|---|---|
| 2003/0120593 | A1* | 6/2003 | Bansal | H04L 67/02 |
| | | | | 705/36 R |
| 2005/0228863 | A1 | 10/2005 | Palmeri et al. | |
| 2006/0015353 | A1* | 1/2006 | Reese | G06Q 10/10 |
| | | | | 709/217 |
| 2006/0031225 | A1* | 2/2006 | Palmeri | G06Q 10/06 |
| 2006/0106941 | A1* | 5/2006 | Singhal | H04L 67/56 |
| | | | | 709/245 |
| 2011/0060957 | A1* | 3/2011 | Bogucharov | H04L 1/1867 |
| | | | | 714/E11.131 |
| 2013/0159468 | A1 | 6/2013 | Kusterer et al. | |
| 2014/0237353 | A1* | 8/2014 | Pirvu | G06F 40/103 |
| | | | | 715/249 |
| 2014/0280494 | A1* | 9/2014 | Samoylenko | H04L 67/10 |
| | | | | 709/203 |
| 2014/0351795 | A1* | 11/2014 | Alfieri | G06F 30/3312 |
| | | | | 717/125 |
| 2015/0244567 | A1* | 8/2015 | Chen | H04L 41/0803 |
| | | | | 715/733 |
| 2017/0302754 | A1* | 10/2017 | Busatta | H04L 67/564 |
| 2018/0004767 | A1* | 1/2018 | Lamanna | G06F 16/16 |
| 2018/0324204 | A1* | 11/2018 | McClory | G06F 9/5027 |
| 2019/0208022 | A1* | 7/2019 | Pfeifer | G06F 9/00 |
| 2019/0356754 | A1* | 11/2019 | Sahoo | H04L 69/02 |
| 2020/0220875 | A1* | 7/2020 | Harguindeguy | H04L 63/101 |
| 2020/0250013 | A1* | 8/2020 | Boran | H04L 65/1033 |
| 2020/0287982 | A1* | 9/2020 | Dinh | H04L 67/562 |
| 2020/0301674 | A1* | 9/2020 | Swope | G06F 9/54 |
| 2020/0389543 | A1* | 12/2020 | Swope | H04L 67/34 |
| 2022/0086215 | A1* | 3/2022 | Rowe | H04L 43/0864 |
| 2023/0089128 | A1* | 3/2023 | Lamb | G06F 16/24 |
| | | | | 726/6 |
| 2023/0222021 | A1* | 7/2023 | Ahmed | G06F 9/543 |
| | | | | 719/318 |
| 2024/0022635 | A1* | 1/2024 | Dagys | H04L 67/56 |
| 2024/0103940 | A1* | 3/2024 | Gras | H04L 67/02 |
| 2024/0143323 | A1* | 5/2024 | Sun | G06F 9/547 |

OTHER PUBLICATIONS

Moberg et al, RFC 4130 MIME-Based Secure Peer-to-Peer Business Data Interchange Using HTTP, Applicability Statement 2 (AS2), Jul. 2005 (Year: 2005).*

Indrasiri, K., Siriwardena, P. (2018). Integrating Microservices. In: Microservices for the Enterprise. Apress, Berkeley, CA, (Chapters 4, 7,9 and 10) (Year: 2018) (Year: 2018).*

"Communication: Extended European Search Report", Feb. 18, 2025 (Feb. 18, 2025), European Patent Office, for European Application No. 24198317.0-1203, 10 pages.

"Communication pursuant to Article 94(3) EPC", Oct. 22, 2025 (Oct. 22, 2025), European Patent Office, for European Application No. 24198317.0-1203, 9 pages.

* cited by examiner

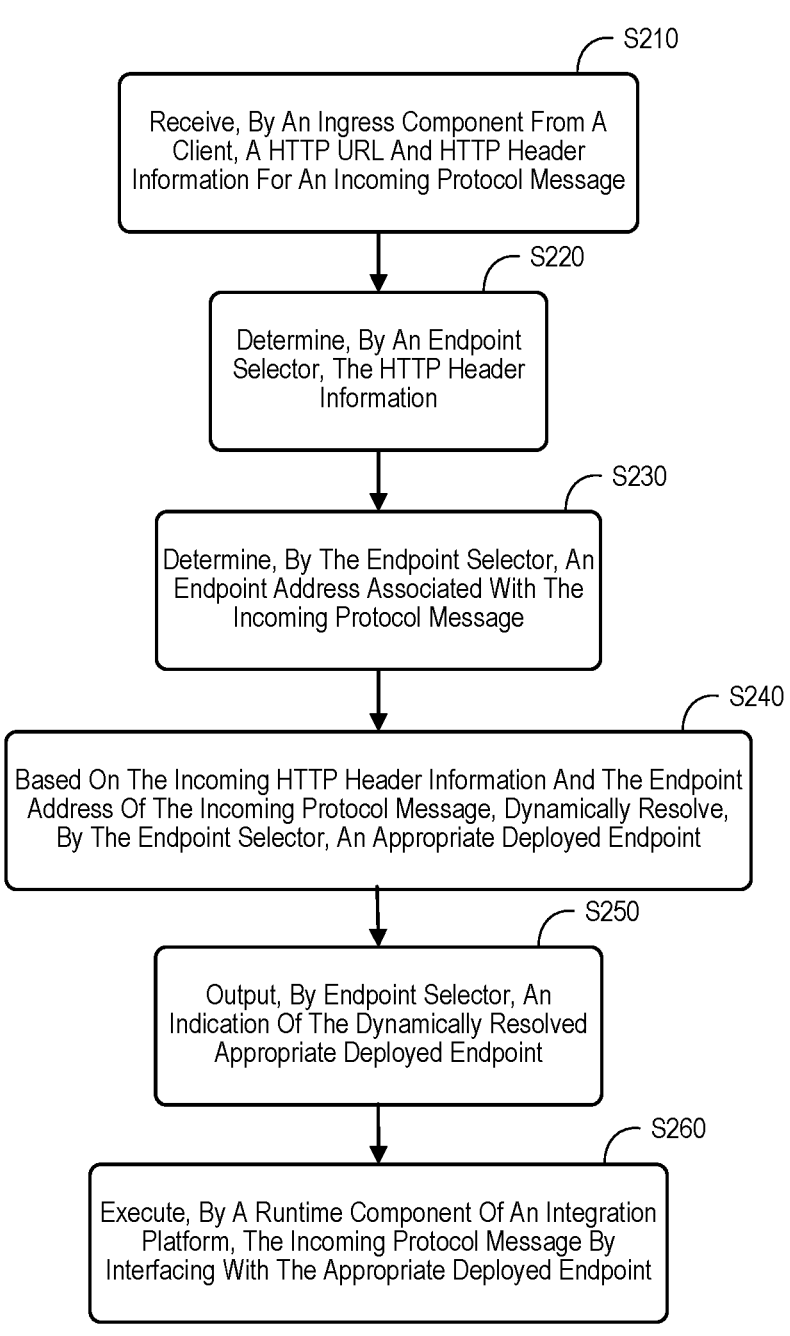

S210

Receive, By An Ingress Component From A Client, A HTTP URL And HTTP Header Information For An Incoming Protocol Message

S220

Determine, By An Endpoint Selector, The HTTP Header Information

S230

Determine, By The Endpoint Selector, An Endpoint Address Associated With The Incoming Protocol Message

S240

Based On The Incoming HTTP Header Information And The Endpoint Address Of The Incoming Protocol Message, Dynamically Resolve, By The Endpoint Selector, An Appropriate Deployed Endpoint

S250

Output, By Endpoint Selector, An Indication Of The Dynamically Resolved Appropriate Deployed Endpoint

S260

Execute, By A Runtime Component Of An Integration Platform, The Incoming Protocol Message By Interfacing With The Appropriate Deployed Endpoint

| INCOMING MESSAGE IDENTIFIER 602 | HTTP URL AND HEADER 604 | FROM/TO/SUBJECT/ID 606 | ENDPOINT PROXY 608 | AS2 ENDPOINT 610 |
|---|---|---|---|---|
| IM_101 | | | | |
| IM_102 | | | | |
| IM_103 | | | | |
| IM_104 | | | | |

FRAMEWORK TO RESOLVE PROTOCOL ENDPOINTS IN INTEGRATION PLATFORM

BACKGROUND

An enterprise may use an integration platform to communicate with other parties. The integration platform may represent a set of integration software products that let users develop, secure, and govern integration flows that connect various applications, systems, services and data stores. The integration platform may also enable rapid Application Programming Interface ("API") creation and lifecycle management. In some cases, Electronic Data Interchange ("EDI") information may be exchanged by sending business documents (e.g., purchase orders or invoices) between companies in a standard format.

Information may be exchanged in accordance with various data transport specifications or protocols. By way of example only, Applicability Statement 2 ("AS2") defines one way to transport structured business-to-business data securely and reliably over the Internet using digital certificates and encryption. AS2 is specified in Request For Comment ("RFC") 4130 from the Internet Engineering Task Force ("IETF") and is based on a Hyper Text Transfer Protocol ("HTTP") Uniform Resource Locator ("URL") and Secure/Multipurpose Internet Mail Extensions ("S/MIME") encryption. Files may be encoded as "attachments" in a standardized S/MIME message (an AS2 message) and file contents are in a standardized format, such as Extensible Markup Language ("XML"). In general, AS2 can be used such that documents may be encrypted/decrypted, compressed/decompressed, signed/verified, etc.

In an integration environment, components such as HTTP, Simple Object Access Protocol ("SOAP"), Representational State Transfer ("REST"), etc. may provide the capability for the partners to connect to fixed endpoints. Further, protocols like AS2 utilize not only fixed endpoints but also use dynamic headers. An integration developer can model multiple scenarios, and a partner can invoke the desired endpoint either by invoking the same fixed endpoint or using same endpoint and dynamically setting additional headers in the request. However, during integration runtime the correct integration scenario needs to be identified to process the inbound network request. Moreover, in some systems there will be multiple components (with separate responsibilities). As a result, systems are desired to provide a common framework to resolve custom endpoints across components in an efficient, flexible, secure, and accurate manner.

SUMMARY

According to some embodiments, methods and systems may include an ingress component that receives, from a client, an HTTP URL and HTTP header information for an incoming protocol message (e.g., an AS2 message). An endpoint selector may determine the HTTP header information along with an endpoint address associated with the incoming protocol message. Based on the incoming HTTP header information and the endpoint address of the incoming protocol message, the endpoint selector may dynamically resolve an appropriate deployed endpoint and output an indication of the dynamically resolved appropriate deployed endpoint. A runtime component of an integration platform may then execute the incoming protocol message and interface with the appropriate deployed endpoint.

Some embodiments comprise: means for receiving, by an ingress component from a client, a HTTP URL and HTTP header information for an incoming protocol message; means for determining, by a computer processor of an endpoint selector, the HTTP header information; means for determining, by the computer processor, an endpoint address associated with the incoming protocol message; based on the incoming HTTP header information and the endpoint address of the incoming protocol message, means for dynamically resolving, by the computer processor, an appropriate deployed endpoint; means for outputting, by the computer processor, an indication of the dynamically resolved appropriate deployed endpoint; and means for executing, by a runtime component of an integration platform coupled to the ingress component, the incoming protocol message by interfacing with the appropriate deployed endpoint.

Some technical advantages of some embodiments disclosed herein are improved systems and methods to resolve custom endpoints across components in an efficient, flexible, secure, and accurate manner.

BRIEF DESCRIPTION OF THE DRAWINGS

FIG. 2 is a custom endpoint resolution method according to some embodiments.

FIG. 6 is a portion of an endpoint resolution data store according to some embodiments.

DETAILED DESCRIPTION

Briefly, some embodiments help provide a framework to resolve custom endpoints across components associated with an integration platform in an efficient, flexible, secure, and accurate manner. In the following detailed description, numerous specific details are set forth in order to provide a thorough understanding of embodiments. However, it will be understood by those of ordinary skill in the art that the embodiments may be practiced without these specific details. In other instances, well-known methods, procedures, components, and circuits have not been described in detail so as not to obscure the embodiments.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developer's specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
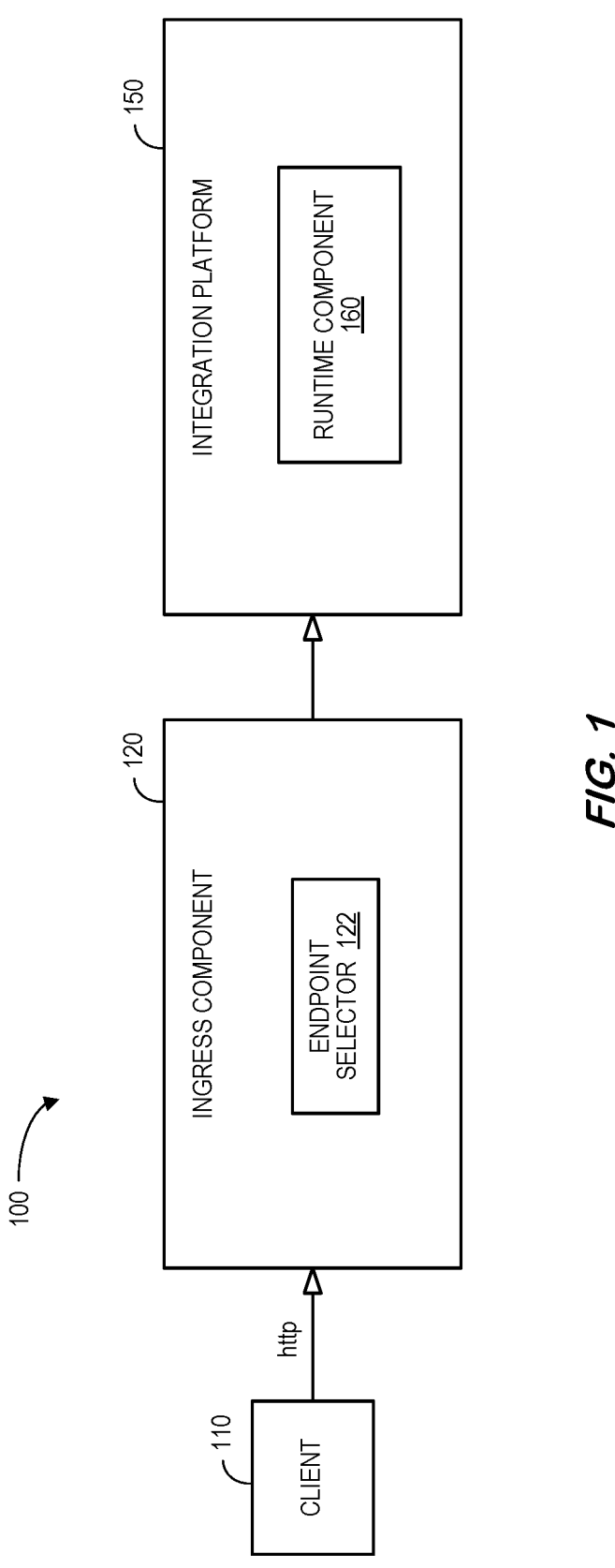
FIG. 1 is a high-level block diagram of a custom endpoint resolution system in accordance with some embodiments.

FIG. 1 is a high-level block diagram of a custom endpoint resolution system 100 in accordance with some embodiments. The system 100 includes a client 110 that can access a runtime component 160 of an integration platform 150 via an ingress component 120. Moreover, an endpoint selector 122 may be located at the ingress component 120. The endpoint selector 122 might be part of or separate from ingress component 120. According to some embodiments, devices, including those associated with the system 100 and any other device described herein, may exchange data via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The elements of the system 100 may store data into and/or retrieve data from various data stores, which may be locally stored or reside remote from the ingress component 120 and/or the integration platform 150. Although a single endpoint selector 122 is shown in FIG. 1, any number of such devices may be included. Moreover, various devices described herein might be combined according to embodiments of the present invention. For example, in some embodiments, the endpoint selector 122 and an endpoint resolution data store (not shown in FIG. 1) might comprise a single component or apparatus. Some or all of the system 100 functions may be performed by a constellation of networked apparatuses, such as in a distributed processing or similar cloud-based architecture.

An operator (e.g., a system operator or administrator) may access the system 100 via a remote device (e.g., a Personal Computer ("PC"), tablet, or smartphone) to view data about and/or manage operational data in accordance with any of the embodiments described herein. In some cases, an interactive graphical user interface display may let an operator or administrator define and/or adjust certain parameters (e.g., to set up or adjust various endpoint resolution parameters, generate status reports, etc.) and/or provide or receive automatically generated recommendations, results, and/or alerts from the system 100. As will now be described, the system 100 may offer a software framework to facilitate the resolution of custom endpoints and headers, thereby selecting a desired deployed endpoint in the integration platform 150. In this way, the framework may help ensure a separation of concerns where one component (e.g., the endpoint selector 122) takes care of the dynamic resolution and the other component (the runtime component 160) takes care of core functionalities.

FIG. 2 is an endpoint resolution method according to some embodiments. The flow charts described herein do not imply a fixed order to the steps, and embodiments of the present invention may be practiced in any order that is practicable. Note that any of the methods described herein may be performed by hardware, software, an automated script of commands, or any combination of these approaches. For example, a computer-readable storage medium may store thereon instructions that when executed by a machine result in performance according to any of the embodiments described herein.

At S210, an ingress component may receive, from a client, a HTTP URL and HTTP header information for an incoming protocol message. According to some embodiments, the ingress component is an API gateway processor. Moreover, the ingress component may, according to some embodiment, also set a traffic rate limit, implement an authentication policy, etc. According to some embodiments, the incoming protocol message is associated with the AS2 protocol. In this case, the HTTP header information might include an AS2 "from" address, an AS2 "to" address, a subject, an AS2 identifier, etc. In other embodiments, the incoming protocol message is instead associated with the Applicability Statement 4 ("AS4") protocol, (ii) the Open Data ("OData") protocol or similar transport standard.

At S220, a computer processor of an endpoint selector may determine the HTTP header information. Similarly, at S230, the endpoint selector may determine an endpoint address associated with the incoming protocol message. Based on the incoming HTTP header information and the endpoint address of the incoming protocol message, at S240 the endpoint selector may dynamically resolve an appropriate deployed endpoint. For example, the HTTP URL and HTTP header information may define an endpoint proxy and the appropriate deployed endpoint is associated with a sender channel.

At S250, the endpoint selector may output an indication of the dynamically resolved appropriate deployed endpoint. As a result, at S260 a runtime component of an integration platform (coupled to the ingress component) can execute the incoming protocol message by interfacing with the appropriate deployed endpoint.

Figure 3:
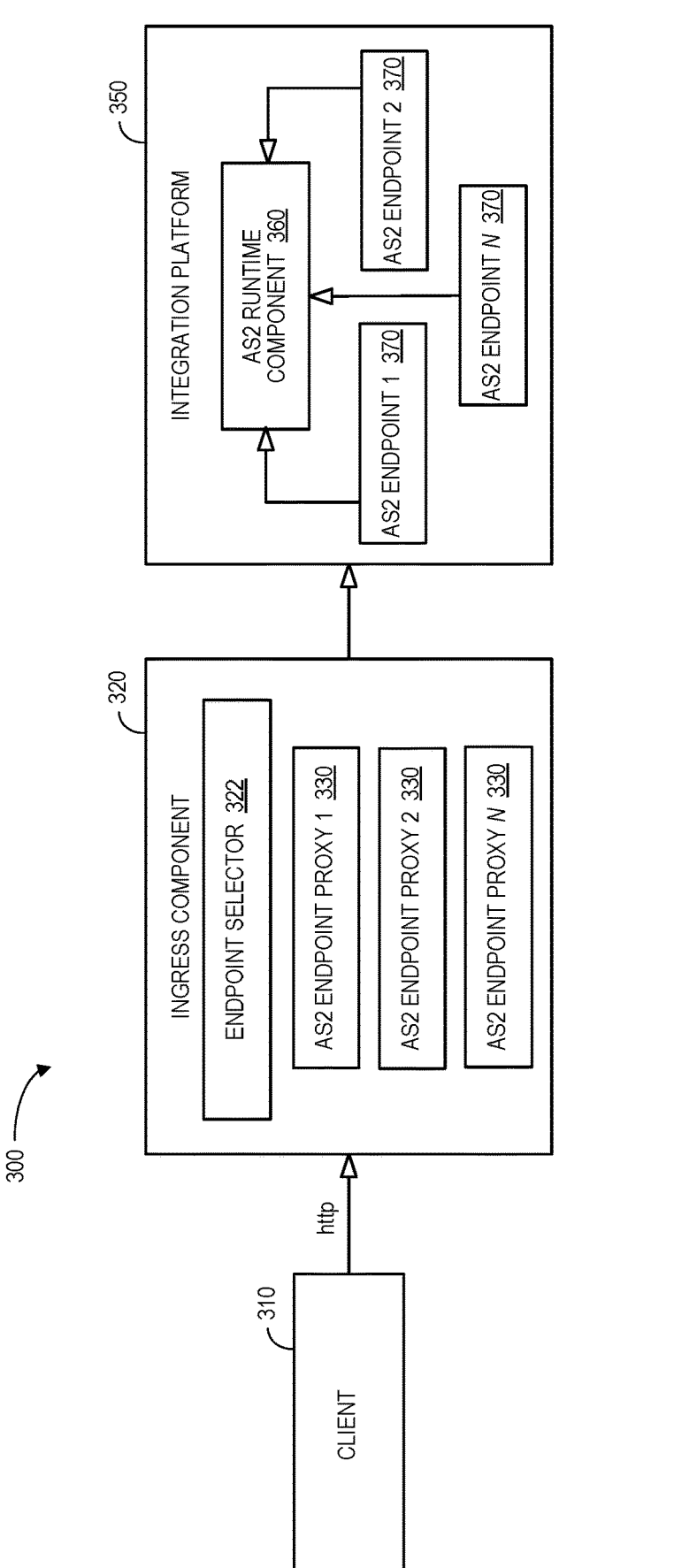
FIG. 3 is an example of an AS2 implementation of an endpoint resolution system in accordance with some embodiments.

FIG. 3 is an example of an AS2 implementation of an endpoint resolution system 300 in accordance with some embodiments. As before, the system 300 includes a client 310 that can access a runtime component 360 of an integration platform 350 via an ingress component 320. Moreover, an endpoint selector 322 may be located at the ingress component 320. The endpoint selector 322 might be part of or separate from ingress component 320. According to some embodiments, devices, including those associated with the system 300 and any other device described herein, may exchange data via any communication network which may be one or more of a LAN, a MAN, a WAN, a proprietary network, a PSTN, a WAP network, a Bluetooth network, a wireless LAN network, and/or an IP network such as the Internet, an intranet, or an extranet. Note that any devices described herein may communicate via one or more such communication networks.

The elements of the system 300 may store data into and/or retrieve data from various data stores, which may be locally stored or reside remote from the ingress component 320 and/or the integration platform 350. Although a single endpoint selector 322 is shown in FIG. 3, any number of such devices may be included. Moreover, various devices described herein might be combined according to embodiments of the present invention.

In an integration environment, protocols such as AS2 may provide the capability for partners to connect not only via a fixed endpoints but also through dynamic headers. An integration developer can model multiple scenarios, and a partner can invoke the desired endpoint by dynamically setting the headers in the request. The introduction of new systems with on-premise runtime engines may help deliver an integration solution across cloud and on-premise systems with a common integration platform (e.g., SAP® Edge Integration Cell™). In such cases, there may be multiple components with separate responsibilities. As a result, a common framework may be desired to resolve custom endpoints across all components.

Some embodiments described herein may provide a software framework to facilitate the resolution of custom endpoints and headers. Moreover, the desired deployed endpoint in an integration platform may be selected. In this way, the framework can help ensure the separation of concerns where one component takes care of dynamic endpoint resolution (e.g., the ingress component 320 and the endpoint selector 322) while another other component takes care of core functionalities (e.g., the integration platform 35 and the AS2 runtime component 360).

The ingress component 320 may have a set of AS2 endpoint proxies 330 (e.g., AS2 endpoint proxy 1 through AS2 endpoint proxy N). The ingress component 320 may, according to some embodiments, comprise an API gateway processor that lets users set rate limits, implement authentication policies, etc. in connection with the endpoints. The endpoint selector 322 may identify the exact AS2 endpoint based on the HTTP URL and HTTP headers. Moreover, based on the set headers, it may identify the exact AS2 sender channel.

According to some embodiments, the As2 endpoint selector 322 may be responsible for selecting an appropriate endpoint of AS2 based on incoming headers. For example, the following incoming headers might be considered for this selection:

AS2-From,
AS2-To,
Subject, and/or
AS2-ID.

Along with these four headers, the endpoint address may also play a part in the selection.

The AS2 runtime component 360 of the integration platform 350 may comprise a processor that is associated with a set of AS2 endpoints 370 (e.g., AS2 endpoint 1 through AS2 endpoint N). The AS2 runtime component 360 may, for example, execute the actual messages based on AS2 protocol. Basically, this responsibility of selection is thereby separated out as a reusable entity. The integration platform 350 does not need to worry about the endpoint selection and instead can focus on performing actual runtime executions. Note that this framework is reusable for any other protocol, such as AS4, OData, etc. and the system can simply plug in the corresponding components as appropriate.

Figure 4:
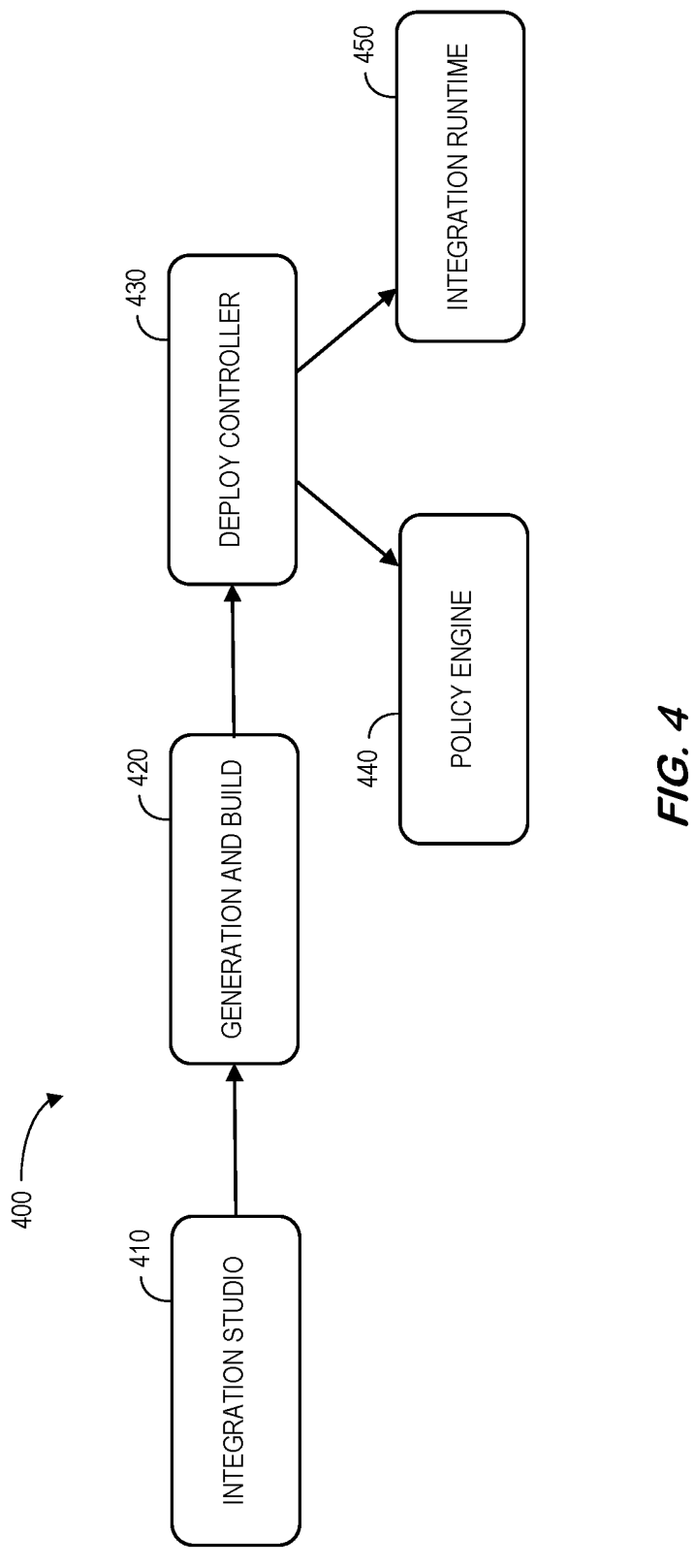
FIG. 4 is an integration platform information flow according to some embodiments.

FIG. 4 is an integration platform information flow 400 according to some embodiments. An integration studio 410 communicates with a deploy controller 430 via generation and build 420. The deploy controller 430 in turn communicates with a policy engine 440 and an integration runtime 450. The integration studio 410 may be used, for example, to create an iFlow object that models integration processes developed by a customer. The iFlow model may then be transformed by the generation and build 420 framework into a special data format. The format may include, for example, two parts. The first part of the format can be understood by the policy engine 440 to generate inbound end points and the policies enforceable by the engine. The second part may contain instructions and processing logic that is executed by the runtime engine. This second part may, for example, process the integration content during runtime. The deploy controller 430 deploys both of these parts of the format on two distinct components. The inbound network traffic from the customer may come into the runtime through the policy engine 440 which applies API management specific features, such as traffic rate limiting, on the worker.

Thus, embodiments may provide an AS2 adapter-specific enhancement where HTTP headers are specified in the generation framework and are then parsed by the policy engine 440 framework to route and associate the inbound message to the worker runtime as appropriate.

Figure 5:
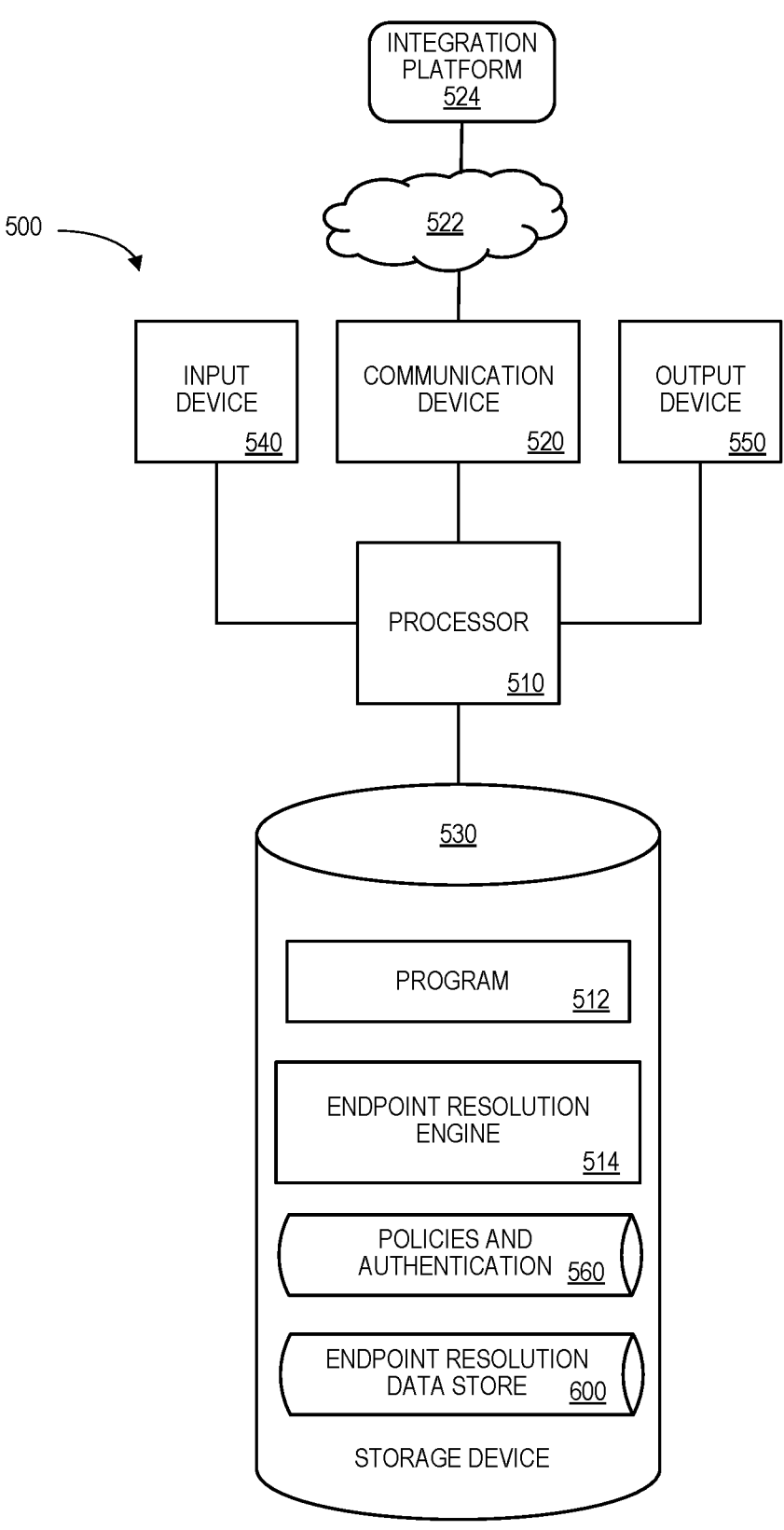
FIG. 5 is an apparatus in accordance with some embodiments.

Note that the embodiments described herein may be implemented using any number of different hardware configurations. For example, FIG. 5 is a block diagram of an apparatus or platform 500 that may be, for example, associated with the systems 100, 300 of FIGS. 1 and 3, respectively (and/or any other system described herein). The platform 500 comprises a processor 510, such as one or more commercially available CPUs in the form of one-chip microprocessors, coupled to a communication device 520 configured to communicate via a communication network 522. The communication device 520 may be used to communicate, for example, with one or more integration platforms 524 via the communication network 522. The platform 500 further includes an input device 540 (e.g., a computer mouse and/or keyboard to input data about endpoint resolution) and an output device 550 (e.g., a computer monitor to render a display, transmit recommendations or alerts, and/or create monitoring reports). According to some embodiments, a mobile device and/or PC may be used to exchange data with the platform 500.

The processor 510 also communicates with a storage device 530. The storage device 530 can be implemented as a single database, or the different components of the storage device 530 can be distributed using multiple databases (that is, different deployment data storage options are possible). The storage device 530 may comprise any appropriate data storage device, including combinations of magnetic storage devices (e.g., a hard disk drive), optical storage devices, mobile telephones, and/or semiconductor memory devices. The storage device 530 stores a program 512 and/or endpoint resolution engine 514 for controlling the processor 510. The processor 510 performs instructions of the programs 512, 514, and thereby operates in accordance with any of the embodiments described herein. For example, the processor 510 may determine the HTTP header information along with an endpoint address associated with the incoming protocol message (e.g., an AS2 message). Based on the incoming HTTP header information and the endpoint address of the incoming protocol message, the processor 510 may dynamically resolve an appropriate deployed endpoint and output an indication of the dynamically resolved appropriate deployed endpoint. A runtime component of an integration platform can then execute the incoming protocol message and interface with the appropriate deployed endpoint.

The programs 512, 514 may be stored in a compressed, uncompiled and/or encrypted format. The programs 512, 514 may furthermore include other program elements, such as an operating system, clipboard application, a database management system, and/or device drivers used by the processor 510 to interface with peripheral devices.

As used herein, data may be "received" by or "transmitted" to, for example: (i) the platform 500 from another device; or (ii) a software application or module within the platform 500 from another software application, module, or any other source.

In some embodiments (such as the one shown in FIG. 5), the storage device 530 further stores policies and authentication 560 information and an endpoint resolution data store 600. An example of a database that may be used in connection with the platform 500 will now be described in detail with respect to FIG. 6. Note that the database described herein is only one example, and additional and/or different data may be stored therein. Moreover, various databases or data stores may be split or combined in accordance with any of the embodiments described herein. For example, the endpoint resolution data store 600 and endpoint resolution engine 514 might be combined into a single apparatus.

Referring to FIG. 6, a table is shown that represents the endpoint resolution data store 600 that may be stored at the platform 500 according to some embodiments. The endpoint resolution data store 600 may include, for example, entries identifying different incoming messages (e.g., AS2 messages). The endpoint resolution data store 600 may also define fields 602, 604, 606, 608 for each of the entries. The fields 602, 604, 606, 608 may, according to some embodiments, specify: an incoming message identifier 602, an HTTP URL and header 604, from/to/subject/identifier 606 information, an endpoint proxy 608, and an AS2 endpoint 610. The endpoint resolution data store 600 may be created and updated, for example, when a new incoming message is received, custom endpoints are resolved, etc.

The incoming message identifier 602 may comprise, for example, a unique alphanumeric label or link that is associated with a message received from a client (e.g., an AS2 message, an AS4 message, an OData message, etc. The HTTP URL and header 604 may be taken from the incoming message and used to determine the from/to/subject/identifier 606 information. This this way an endpoint proxy 608 and be resolved into an appropriate AS2 endpoint 610 for use by a runtime component of an integration platform.

Figure 7:
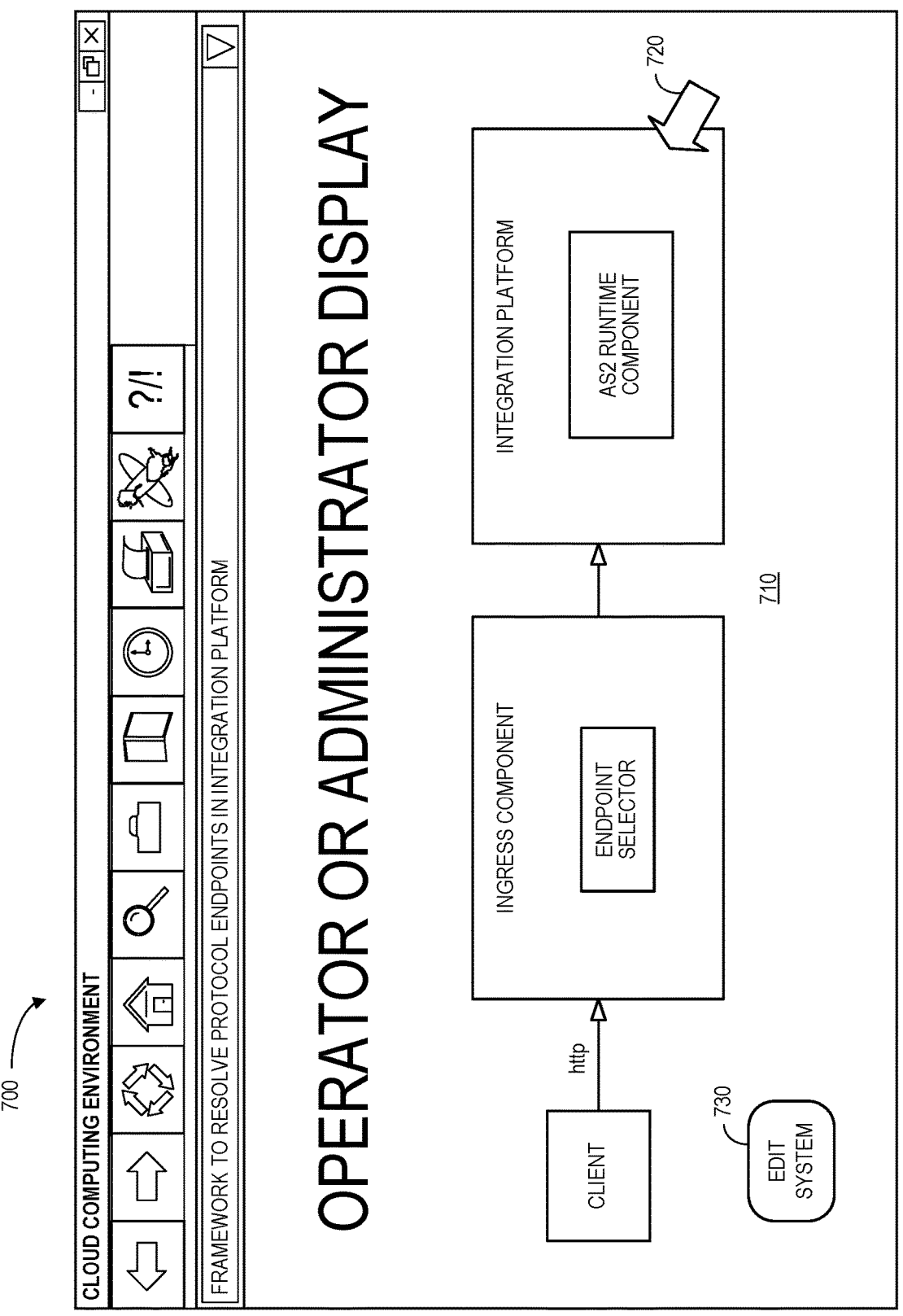
FIG. 7 is an example of an operator or administrator display according to some embodiments.

FIG. 7 is an example of an operator or administrator display according to some embodiments. The display 700 includes a graphical representation 710 or dashboard that might be used to manage or monitor custom endpoint resolutions (e.g., associated with messages received from a client). In particular, selection of an element (e.g., via a touchscreen or computer mouse pointer 720) might result in the display of a popup window that contains configuration or mapping data. The display 700 may also include a user selectable "Edit System" icon 730 to request system changes (e.g., to investigate or improve endpoint resolution rules or logic, to change a data source mapping parameter, etc.).

Thus, embodiments may provide improved systems and methods to resolve custom endpoints across components in an efficient, flexible, secure, and accurate manner.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications with modifications and alterations limited only by the spirit and scope of the appended claims.

Figure 8:
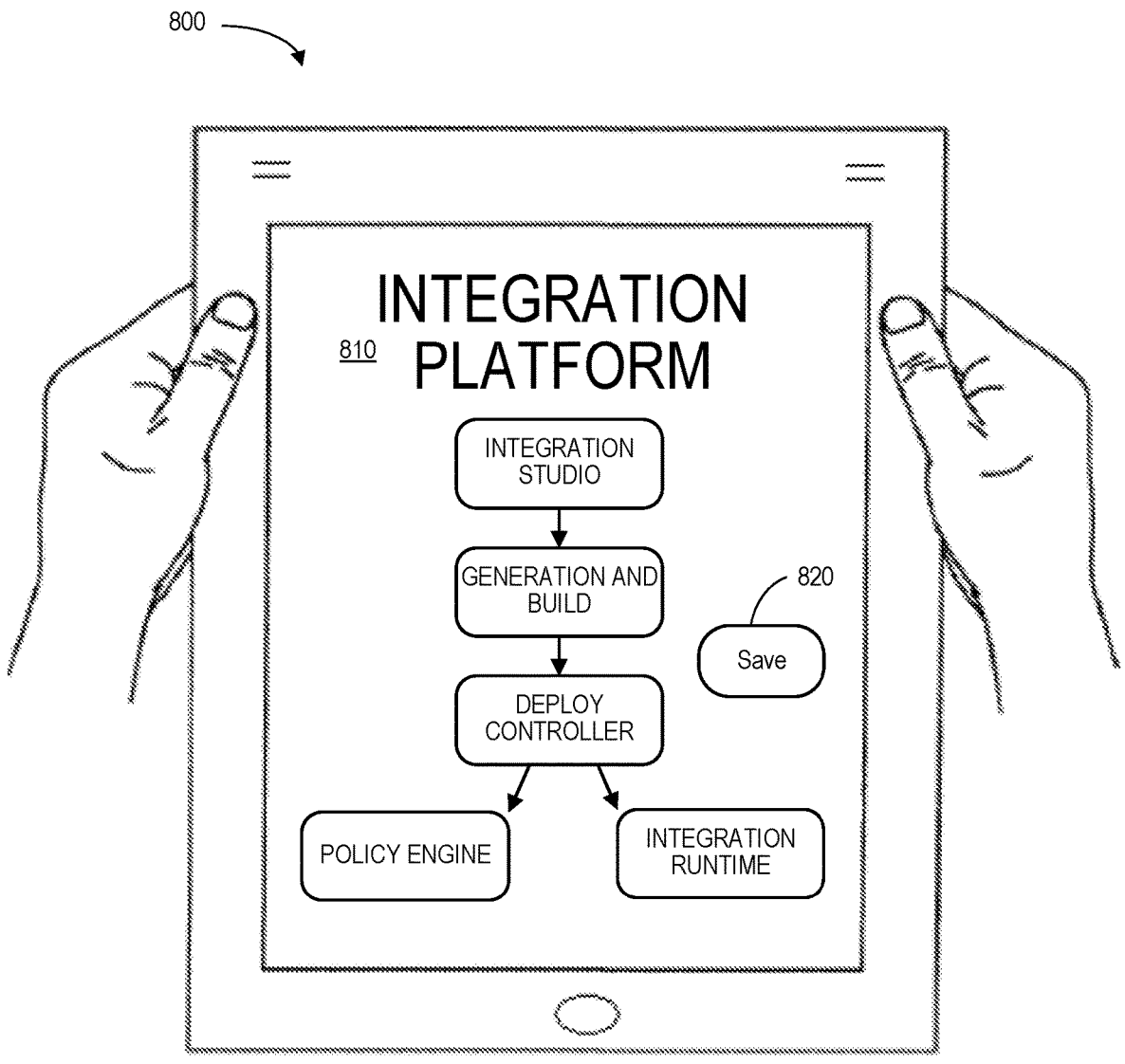
FIG. 8 is a tablet computer showing an integration environment display in accordance with some embodiments.

Although specific hardware and data configurations have been described herein, note that any number of other configurations may be provided in accordance with some embodiments of the present invention (e.g., some of the data associated with the components described herein may be combined or stored in external systems). Moreover, although some embodiments are focused on particular types of protocols and message, any of the embodiments described herein could be applied to other types of protocols and messages. Moreover, the displays shown herein are provided only as examples, and any other type of user interface could be implemented. For example, FIG. 8 shows a handheld tablet computer 800 rendering an integration platform display 810 that may be used to help a user establish endpoint resolution parameters (e.g., by entering and storing information via a "Save" icon 820).

What is claimed is:

1. A system, comprising:

an ingress component to receive, from a client, a HyperText Transfer Protocol ("HTTP") Uniform Resource Locator ("URL") and HTTP header information for an incoming protocol message;

an endpoint selector, including:

a computer processor, and a computer memory coupled to the computer processor and storing instructions that, when executed by the computer processor, cause the endpoint selector to:

determine the HTTP header information, determine an endpoint address associated with the incoming protocol message, wherein the endpoint selector supports incoming protocol messages associated with multiple types of message protocols, including all of the Applicability Statement 2 ("AS2") protocol, the Applicability Statement 4 ("AS4") protocol, and the Open Data ("OData") protocol, based on the incoming HTTP header information and the endpoint address of the incoming protocol message, dynamically resolve an appropriate deployed endpoint, and output an indication of the dynamically resolved appropriate deployed endpoint to an integration platform; and a runtime component of the integration platform, coupled to the ingress component, to execute the incoming protocol message and interface with the appropriate deployed endpoint;

an integration studio that communicates with a deploy controller; wherein the deploy controller communicates with a policy engine and an integration runtime;

wherein integration studio creates an iFlow object that models integration processes;

wherein the iFlow object is transformed into a data format that includes both: (i) a first part understood by the policy engine to generate inbound endpoint addresses, and (ii) a second part that contains instructions and processing logic executed by the integration runtime.

2. The system of claim 1, wherein the ingress component is an Application Programming Interface ("API") gateway processor.

3. The system of claim 2, wherein the ingress component is further to set a traffic rate limit and implement an authentication policy.

4. The system of claim 1, wherein the HTTP URL and HTTP header information define an endpoint proxy and the appropriate deployed endpoint is associated with a sender channel.

5. A method, comprising:

receiving, by an ingress component, from a client, a HyperText Transfer Protocol ("HTTP") Uniform Resource Locator ("URL") and HTTP header information for an incoming protocol message;

determining, by a computer processor of an endpoint selector, the HTTP header information, wherein the endpoint selector supports incoming protocol messages associated with multiple types of message protocols, including all of the Applicability Statement 2 ("AS2") protocol, the Applicability Statement 4 ("AS4") protocol, and the Open Data ("OData") protocol;

determining, by the computer processor, an endpoint address associated with the incoming protocol message;

based on the incoming HTTP header information and the endpoint address of the incoming protocol message, dynamically resolving, by the computer processor, an appropriate deployed endpoint;

outputting, by the computer processor, an indication of the dynamically resolved appropriate deployed endpoint to an integration platform; and executing, by a runtime component of the integration platform coupled to the ingress component, the incoming protocol message by interfacing with the appropriate deployed endpoint;

an integration studio that communicates with a deploy controller; wherein the deploy controller communicates with a policy engine and an integration runtime;

wherein integration studio creates an iFlow object that models integration processes;

wherein the iFlow object is transformed into a data format that includes both: (i) a first part understood by the policy engine to generate inbound endpoint addresses, and (ii) a second part that contains instructions and processing logic executed by the integration runtime.

6. The method of claim 5, wherein the ingress component is an Application Programming Interface ("API") gateway processor.

7. The method of claim 6, wherein the ingress component is further to set a traffic rate limit and implement an authentication policy.

8. The method of claim 5, wherein the HTTP URL and HTTP header information define an endpoint proxy and the appropriate deployed endpoint is associated with a sender channel.

9. A non-transitory, machine-readable medium comprising instructions thereon that, when executed by a processor, cause the processor to execute operations to perform a method, the method comprising:

receiving, by an ingress component, from a client, a HyperText Transfer Protocol ("HTTP") Uniform Resource Locator ("URL") and HTTP header information for an incoming protocol message;

determining, by a computer processor of an endpoint selector, the HTTP header information, wherein the endpoint selector supports incoming protocol messages associated with multiple types of message protocols, including all of the Applicability Statement 2 ("AS2") protocol, the Applicability Statement 4 ("AS4") protocol, and the Open Data ("OData") protocol;

determining, by the computer processor, an endpoint address associated with the incoming protocol message;

based on the incoming HTTP header information and the endpoint address of the incoming protocol message, dynamically resolving, by the computer processor, an appropriate deployed endpoint;

outputting, by the computer processor, an indication of the dynamically resolved appropriate deployed endpoint to an integration platform; and executing, by a runtime component of the integration platform coupled to the ingress component, the incoming protocol message by interfacing with the appropriate deployed endpoint;

an integration studio that communicates with a deploy controller; wherein the deploy controller communicates with a policy engine and an integration runtime;

wherein integration studio creates an iFlow object that models integration processes;

wherein the iFlow object is transformed into a data format that includes both: (i) a first part understood by the policy engine to generate inbound endpoint addresses, and (ii) a second part that contains instructions and processing logic executed by the integration runtime.

10. The medium of claim 9, wherein the ingress component is an Application Programming Interface ("API") gateway processor.

11. The medium of claim 10, wherein the ingress component is further to set a traffic rate limit and implement an authentication policy.

12. The medium of claim 9, wherein the HTTP URL and HTTP header information define an endpoint proxy and the appropriate deployed endpoint is associated with a sender channel.

* * * * *